United States Patent
Izumi

(10) Patent No.: US 10,946,336 B2
(45) Date of Patent: Mar. 16, 2021

(54) OXIDATION CATALYST, CATALYST SUPPORT STRUCTURE, METHOD OF PRODUCING OXIDATION CATALYST, AND METHOD OF PRODUCING CATALYST SUPPORT STRUCTURE

(71) Applicant: NGK INSULATORS, LTD., Nagoya (JP)

(72) Inventor: Yunie Izumi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/295,137

(22) Filed: Mar. 7, 2019

(65) Prior Publication Data

US 2019/0291050 A1 Sep. 26, 2019

(30) Foreign Application Priority Data

Mar. 22, 2018 (JP) .............................. JP2018-055160

(51) Int. Cl.
*B01J 21/04* (2006.01)
*B01J 23/10* (2006.01)
(Continued)

(52) U.S. Cl.
CPC ....... *B01D 53/944* (2013.01); *B01D 53/9418* (2013.01); *B01D 53/9477* (2013.01); *B01J 21/02* (2013.01); *B01J 21/18* (2013.01); *B01J 23/10* (2013.01); *B01J 23/34* (2013.01); *B01J 23/8892* (2013.01); *B01J 35/04* (2013.01); *B01J 37/0018* (2013.01); *B01J 37/0045* (2013.01); *B01J 37/0063* (2013.01); *B01J 37/0215* (2013.01); *B01J 37/0236* (2013.01); *B01J 37/04* (2013.01); *B01J 37/08* (2013.01); *F01N 3/0821* (2013.01); *F01N 3/103* (2013.01); *F01N 3/2073* (2013.01); *B01D 2255/2063* (2013.01); *B01D 2255/2065* (2013.01); *B01D 2255/2073* (2013.01); *B01D 2255/2092* (2013.01); *B01D 2255/20738* (2013.01); *B01D 2255/9155* (2013.01)

(58) Field of Classification Search
CPC ... B01J 21/04; B01J 23/10; B01J 23/34; B01J 23/8892; B01J 35/04; B01J 37/0018; B01J 37/0045; B01J 37/0063; B01J 37/0215; B01J 37/0236; B01J 37/04; B01J 37/08; F01N 3/0821; F01N 3/103; F01N 3/2073
See application file for complete search history.

(56) References Cited

U.S. PATENT DOCUMENTS

| 8,105,559 B2 * | 1/2012 | Melville | ............ | B01D 53/9409 |
| | | | | 423/213.2 |
| 8,765,085 B2 * | 7/2014 | Tran | ..................... | B01D 53/944 |
| | | | | 423/213.2 |

(Continued)

FOREIGN PATENT DOCUMENTS

| JP | 2017-171543 A1 | 9/2017 |
| JP | 2017-185481 A1 | 10/2017 |
| JP | 2017-186220 A1 | 10/2017 |

*Primary Examiner* — Cam N. Nguyen
(74) *Attorney, Agent, or Firm* — Burr & Brown, PLLC

(57) ABSTRACT

An oxidation catalyst includes cerium dioxide particles and a metal oxide. The cerium dioxide particles contain an ancillary component that is at least one of lanthanum, aluminum, and iron. The metal oxide contains iron and manganese and is held by the cerium dioxide particles.

15 Claims, 4 Drawing Sheets

(51) Int. Cl.

| | | |
|---|---|---|
| *B01J 23/34* | (2006.01) | |
| *B01J 23/889* | (2006.01) | |
| *B01J 35/04* | (2006.01) | |
| *B01J 37/00* | (2006.01) | |
| *B01J 37/02* | (2006.01) | |
| *B01J 37/04* | (2006.01) | |
| *B01J 37/08* | (2006.01) | |
| *F01N 3/08* | (2006.01) | |
| *F01N 3/10* | (2006.01) | |
| *F01N 3/20* | (2006.01) | |
| *B01D 53/94* | (2006.01) | |
| *B01J 21/02* | (2006.01) | |
| *B01J 21/18* | (2006.01) | |

(56) References Cited

U.S. PATENT DOCUMENTS

| | | | | |
|---|---|---|---|---|
| 9,034,269 B2 * | 5/2015 | Hilgendorff | ......... | B01J 37/0244 422/170 |
| 9,533,290 B2 * | 1/2017 | Nagao | ...................... | B01J 23/83 |
| 9,849,421 B2 * | 12/2017 | Chandler | ............. | B01D 53/944 |
| 10,265,684 B2 * | 4/2019 | Hatfield | ................. | B01J 23/894 |
| 2009/0297418 A1 * | 12/2009 | Liu | ........................ | B01J 29/166 423/239.1 |
| 2009/0298673 A1 * | 12/2009 | Akamine | ............. | B01J 37/0215 502/65 |
| 2012/0094826 A1 * | 4/2012 | Tanaka | ................ | B01J 37/0203 502/304 |
| 2012/0124899 A1 * | 5/2012 | Difrancesco | ........... | B01J 37/031 44/457 |
| 2013/0336879 A1 * | 12/2013 | Yamazaki | .............. | B01J 35/023 423/658.2 |
| 2014/0323294 A1 * | 10/2014 | Nagao | .................... | B01J 35/002 502/304 |
| 2015/0080211 A1 * | 3/2015 | Miura | .................... | B01J 23/745 502/304 |
| 2015/0352530 A1 * | 12/2015 | Nagao | ................. | B01D 53/944 502/304 |
| 2017/0274357 A1 | 9/2017 | Izumi | | |
| 2017/0284264 A1 | 10/2017 | Izumi et al. | | |
| 2017/0304808 A1 | 10/2017 | Izumi et al. | | |

\* cited by examiner

OXIDATION CATALYST, CATALYST SUPPORT STRUCTURE, METHOD OF PRODUCING OXIDATION CATALYST, AND METHOD OF PRODUCING CATALYST SUPPORT STRUCTURE

BACKGROUND OF THE INVENTION

1. Field of the Invention

The present invention relates to an oxidation catalyst, a catalyst support structure, a method of producing an oxidation catalyst, and a method of producing a catalyst support structure.

2. Description of Related Art

Japanese Patent Applications Laid-Open No. 2017-186220 and No. 2017-185481 propose cerium dioxide particles that contain therein or thereon a transition-metal oxide containing iron and manganese. Such cerium dioxide particles are assumed to be used as an oxidation catalyst in, for example, a diesel particulate filter (DPF) including a diesel oxidation catalyst (DOC) and a catalyzed soot filter (CSF).

Incidentally, the temperature of the DPF becomes high due to combustion of collected soot. Cerium dioxide particles in the aforementioned oxidation catalyst are each usually an aggregate (agglomerated particle) of fine particles of cerium dioxide, and therefore under the aforementioned high temperature conditions, the cerium dioxide particles may partially undergo sintering to reduce their specific surface areas. In this case, the performance of the catalyst deteriorates. Thus, there is demand for improvements in the heat resistance of the oxidation catalyst containing cerium dioxide particles.

SUMMARY OF THE INVENTION

The present invention is directed to an oxidation catalyst, and it is an object of the present invention to improve the heat resistance of an oxidation catalyst containing cerium dioxide particles.

The oxidation catalyst according to the present invention includes cerium dioxide particles containing an ancillary component that is at least one of lanthanum, aluminum, and iron, and a metal oxide containing iron and manganese and held by the cerium dioxide particles.

According to the present invention, it is possible to improve the heat resistance of the oxidation catalyst containing cerium dioxide particles. Also, a filter that supports the oxidation catalyst can achieve improvements in oxidation performance.

In a preferable embodiment of the present invention, a mass ratio of the ancillary component to cerium contained in the cerium dioxide particles is in a range of 3 to 45 mass % in terms of oxides.

In another preferable embodiment of the present invention, a mass ratio of the metal oxide to a whole of the oxidation catalyst is in a range of 5 to 40 mass %.

The present invention is also directed to a catalyst support structure. The catalyst support structure according to the present invention includes a cell structure whose interior is partitioned into a plurality of cells by partition walls, and the aforementioned oxidation catalyst supported by the partition walls.

A preferable catalyst support structure does not contain a precious metal.

The present invention is also directed to a method of producing an oxidation catalyst. The method of producing an oxidation catalyst according to the present invention includes generating cerium dioxide particles containing an ancillary component that is at least one of lanthanum, aluminum, and iron, and causing the cerium dioxide particles to hold a metal oxide containing iron and manganese.

The present invention is also directed to a method of producing a catalyst support structure. The method of producing a catalyst support structure according to the present invention includes a preparation operation of preparing a cell structure whose interior is partitioned into a plurality of cells by partition walls, and a support operation of causing the oxidation catalyst produced by the aforementioned method of producing an oxidation catalyst to be supported by the partition walls.

For example, in the support operation, a fluid in which the oxidation catalyst is dispersed is supplied to the cell structure.

These and other objects, features, aspects and advantages of the present invention will become more apparent from the following detailed description of the present invention when taken in conjunction with the accompanying drawings.

DETAILED DESCRIPTION OF THE INVENTION

Exhaust Gas Purification System

Figure 1:
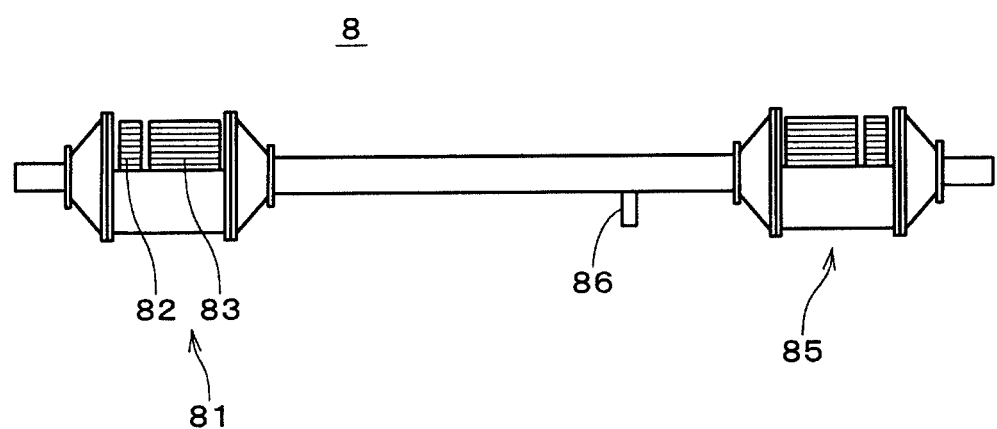
FIG. 1 illustrates a configuration of an exhaust gas purification system.

FIG. 1 illustrates a configuration of an exhaust gas purification system 8. The exhaust gas purification system 8 is configured to purify exhaust gas emitted from an engine. The exhaust gas purification system 8 includes a diesel particulate filter (DPF) 81, a selective catalytic reduction (SCR) catalytic converter 85, and an urea injector 86. The DPF 81, the urea injector 86, and the SCR catalytic converter 85 are arranged in this order in the direction of flow of the exhaust gas.

The DPF 81 includes a diesel oxidation catalyst (DOC) 82 and a catalyzed soot filter (CSF) 83. The DOC 82 includes a honeycomb structure whose interior is partitioned into a plurality of cells by partition walls, and an oxidation catalyst of precious metal supported by the partition walls. The CSF 83 includes a honeycomb structure similar to above and an oxidation catalyst of non-precious metal supported by partition walls of the honeycomb structure. Details of the structure of the CSF 83 will be described later. The urea injector 86 is provided in a path of the exhaust gas between the DPF 81 and the SCR catalytic converter 85. The SCR catalytic converter 85 includes a honeycomb structure similar to above and an SCR catalyst supported by partition walls of the honeycomb structure.

The exhaust gas emitted from the engine flows into the DOC 82 of the DPF 81. The exhaust gas contains nitrogen monoxide (NO), oxygen ($O_2$), and nitrogen ($N_2$) and undergoes reactions expressed by Equations 1 and 2 below in the DOC 82. The reaction expressed by Equation 1 generates nitrogen dioxide ($NO_2$). Note that a soluble organic fraction (SOF) in Equation 2 below is contained in particulate matter (PM) in the exhaust gas.

$$2NO+O_2=2NO_2 \quad \text{(Equation 1)}$$

$$SOF+O_2=CO,CO_2,H_2O \quad \text{(Equation 2)}$$

The CSF 83 collects carbon (soot) contained in the exhaust gas. In the CSF 83, the soot and $NO_2$ undergo reactions (combustion reactions) expressed by Equations 3, 4, and 5 below so that NO is generated from $NO_2$.

$$C(soot)+2NO_2=CO_2+2NO \quad \text{(Equation 3)}$$

$$C(soot)+NO_2=CO+NO \quad \text{(Equation 4)}$$

$$C(soot)+\tfrac{1}{2}O_2+NO_2=CO_2+NO \quad \text{(Equation 5)}$$

The urea injector 86 mixes urea into the exhaust gas emitted from the CSF 83, and exhaust gas that contains ammonia ($NH_3$) generated by decomposition of urea flows into the SCR catalytic converter 85. In the SCR catalytic converter 85, reactions expressed by Equations 6, 7, and 8 below occur to purify $NO_x$ contained in the exhaust gas.

$$4NO+4NH_3+O_2=4N_2+6H_2O \quad \text{(Equation 6)}$$

$$NO+NO_2+2NH_3=2N_2+3H_2O \quad \text{(Equation 7)}$$

$$6NO_2+8NH_3=7N_2+12H_2O \quad \text{(Equation 8)}$$

The reaction expressed by Equation 7 is called a fast SCR reaction and occurs at a higher reaction rate than the reactions expressed by Equations 6 and 8. In order to improve the efficiency of reactions occurring in the SCR catalytic converter 85 in accordance with Equation 7, it is required that the ratio of the amount of substance of NO to the amount of substance of $NO_2$, which flow into the SCR catalytic converter 85, be 1:1. On the other hand, the CSF 83 consumes a large amount of $NO_2$ and generates NO in the combustion of soot as expressed by Equations 3, 4, and 5 described previously.

In view of this, the exhaust gas purification system 8 according to the present invention includes a catalyst support structure that supports an oxidation catalyst, which will be described later, as a downstream portion of the CSF 83. The catalyst support structure oxidizes part of NO to generate $NO_2$, i.e., converts NO into $NO_2$. This makes it possible to bring the ratio of the amount of substance of NO to the amount of substance of $NO_2$, which flow into the SCR catalytic converter 85, closer to 1:1 and to improve the efficiency of reactions occurring in the SCR catalytic converter 85.

Catalyst Support Structure

Figure 2:
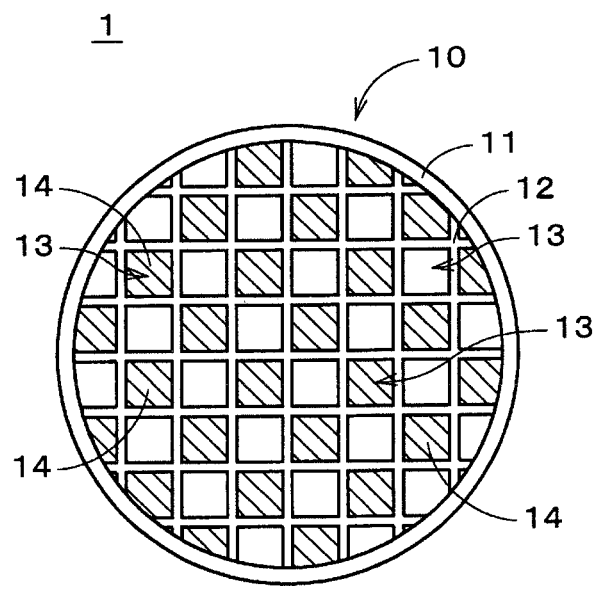
FIG. 2 illustrates a catalyst support structure.
Figure 3:
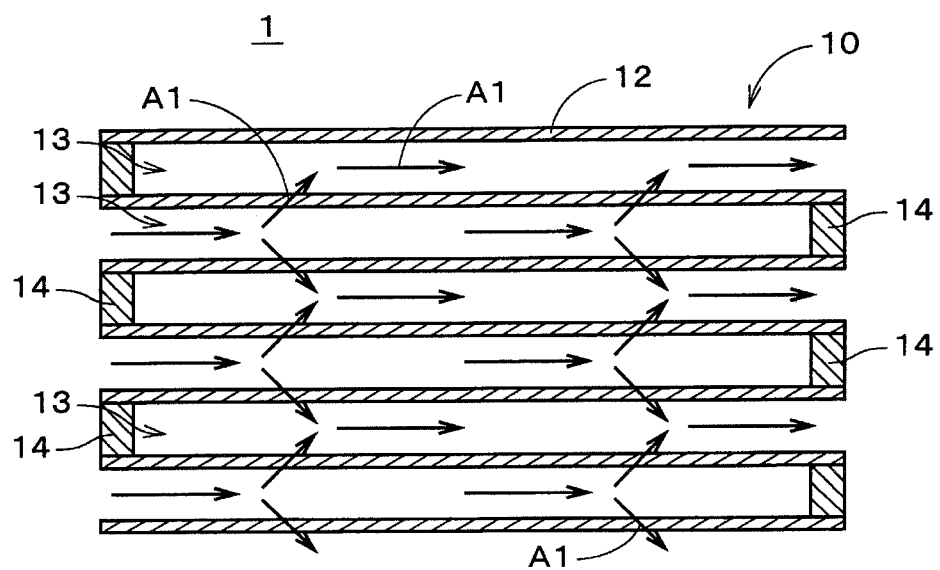
FIG. 3 is a sectional view of the catalyst support structure.

FIG. 2 illustrates a catalyst support structure 1 that supports an oxidation catalyst in simplified form. The catalyst support structure 1 is a tubular member that is long in one direction, and FIG. 2 illustrates the end face on one side in the longitudinal direction of the catalyst support structure 1. FIG. 3 is a sectional view of the catalyst support structure 1 and illustrates part of a section extending in the longitudinal direction of the catalyst support structure 1.

The catalyst support structure 1 includes a honeycomb structure 10 and an oxidation catalyst. The honeycomb structure 10 includes a tubular outer wall 11 and partition walls 12. The tubular outer wall 11 has a tubular shape extending in the longitudinal direction. A cross-sectional shape of the tubular outer wall 11 perpendicular to the longitudinal direction is, for example, circular, or may be polygonal or any other shape. The partition walls 12 are provided in the interior of the tubular outer wall 11 and partition the interior into a plurality of cells 13. The honeycomb structure 10 is a cell structure whose interior is partitioned into the plurality of cells 13 by the partition walls 12. The tubular outer wall 11 and the partition walls 12 are made of a porous material. The oxidation catalyst is supported in the pores of the porous material. As will be described later, the exhaust gas passes through the pores of the partition walls 12. In order to improve the strength of the catalyst support structure 1, the thickness of the partition walls 12 is, for example, greater than or equal to 50 micrometers (m), preferably greater than or equal to 100 μm, and more preferably greater than or equal to 150 μm. In order to reduce pressure loss in the partition walls 12, the thickness of the partition walls 12 is, for example, less than or equal to 500 μm and preferably less than or equal to 450 μm.

Each cell 13 is a space extending in the longitudinal direction. A cross-sectional shape of the cells 13 perpendicular to the longitudinal direction is, for example, polygonal (e.g., triangular, quadrangular, pentagonal, or hexagonal), or may be circular or any other shape. The plurality of cells 13 typically has the same cross-sectional shape. Alternatively, the plurality of cells 13 may include cells 13 having different cross-sectional shapes. In order to improve oxidation performance, the density of the cells is, for example, higher than or equal to 8 cells per square centimeter (/$cm^2$) and preferably higher than or equal to 15 cells/$cm^2$. In order to reduce pressure loss, the density of the cells is, for example, lower than or equal to 95 cells/$cm^2$ and preferably lower than or equal to 78 cells/$cm^2$.

In the catalyst support structure 1 used in the CSF 83, the exhaust gas from the DOC 82 flows, using one end in the longitudinal direction of the honeycomb structure 10 as an inlet and the other end as an outlet. A predetermined number of cells 13 are each provided with a sealer 14 at its end on the inlet side, and the remaining cells 13 are each provided with a sealer 14 at its end on the outlet side. Therefore, the exhaust gas flowing into the honeycomb structure 10 travels from the cells 13 whose inlet side is not sealed to the cells 13 whose outlet side is not sealed through the partition walls 12 (see arrows A1 in FIG. 3). At this time, the exhaust gas is oxidized by the oxidation catalyst supported by the partition walls 12. At each end on the inlet and outlet sides of the honeycomb structure 10, it is preferable that the sealers 14 are alternately provided in the direction of arrangement of the cells 13.

Figure 4:
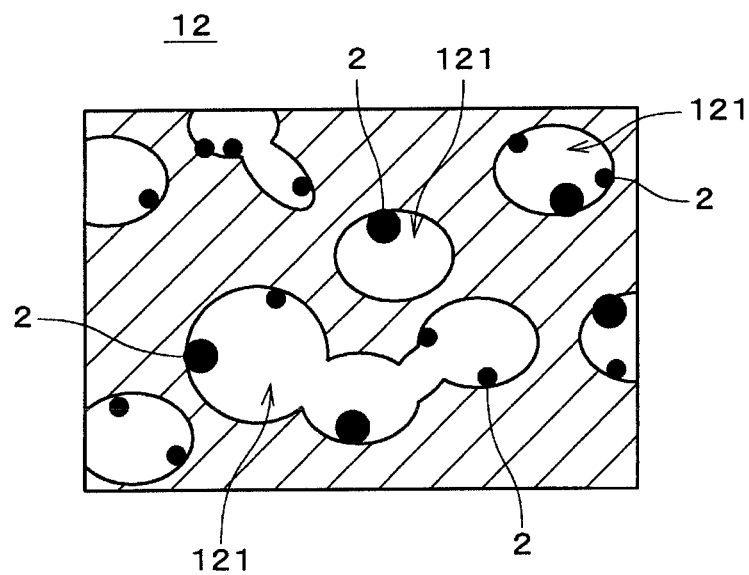
FIG. 4 illustrates part of a partition wall in enlarged dimensions.

FIG. 4 illustrates part of a partition wall 12 in enlarged dimensions. The porous material forming the partition walls 12 is provided with a large number of pores 121, and an oxidation catalyst 2 is supported in the pores 121. In FIG. 4, the oxidation catalyst 2 is indicated by filled circles. In order to improve the rate of conversion from NO to $NO_2$ (hereinafter, simply referred to as an "$NO_2$ conversion rate") in the catalyst support structure 1, the amount of the supported oxidation catalyst 2 is, for example, larger than or equal to 3 grams per liter (g/L), preferably larger than or equal to 5 g/L, and more preferably larger than or equal to 8 g/L. In order to reduce pressure loss, the amount of the supported oxidation catalyst 2 is, for example, smaller than or equal to 50 g/L, preferably smaller than or equal to 45 g/L, and more preferably smaller than or equal to 40 g/L. The amount of the supported oxidation catalyst 2 (g/L) indicates the amount (g)

of the oxidation catalyst 2 supported per unit volume (L) of the honeycomb structure 10. Details of the oxidation catalyst 2 will be described later.

One preferable example of the porous material forming the partition walls 12 is ceramics. From the viewpoint of strength, heat resistance, corrosion resistance, and other properties, it is preferable to use, for example, cordierite, silicon carbide, alumina, mullite, aluminum titanate, silicon nitride, or silicon-silicon carbide composites. Note that the silicon-silicon carbide composites are formed using silicon carbide as an aggregate and metal silicon as a binding material.

In order to reduce pressure loss, the open porosity of the porous material (partition walls 12) is, for example, higher than or equal to 25%, preferably higher than or equal to 30%, and more preferably higher than or equal to 35%. From the viewpoint of the strength of the partition walls 12, the open porosity of the porous material is, for example, lower than or equal to 70% and preferably lower than or equal to 65%. The open porosity can be measured by, for example, Archimedes method using deionized water as a medium. The mean pore diameter of the porous material is, for example, greater than or equal to 5 µm and preferably greater than or equal to 8 µm. Pressure loss decreases as the mean pore diameter increases, as in the case of the open porosity. In order to improve oxidation performance, the mean pore diameter of the porous material is, for example, less than or equal to 40 µm, preferably less than or equal to 30 µm, and more preferably less than or equal to 25 µm. The mean pore diameter can be measured by, for example, mercury intrusion porosimetry (in accordance with JIS R1655). Depending on the design of the catalyst support structure 1, the sealers 14 may be omitted, and the oxidation catalyst 2 may be held in a layer on the surfaces of the cells 13.

Oxidation Catalyst

Figure 5:
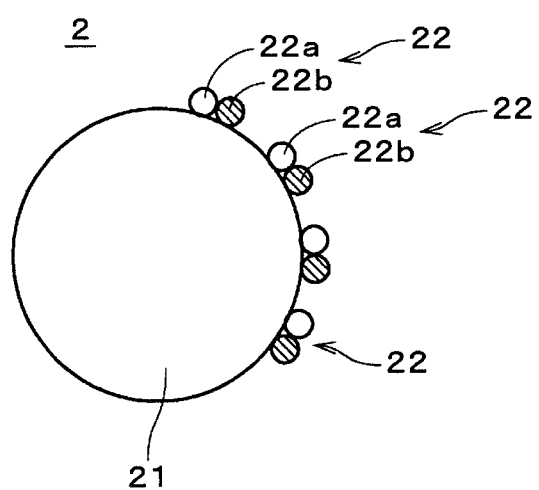
FIG. 5 illustrates an oxidation catalyst.

FIG. 5 schematically illustrates one particle of the oxidation catalyst 2. The oxidation catalyst 2 includes cerium dioxide ($CeO_2$) particles 21 and a metal oxide 22 held by the cerium dioxide particles 21. Each cerium dioxide particle 21 is, for example, an aggregate (agglomerated particle) of fine particles of cerium dioxide. In FIG. 5, one cerium dioxide particle 21, which is an agglomerated particle, is indicated by a circle. The cerium dioxide particles 21 contain an ancillary component that is at least one of lanthanum (La), aluminum (Al), and iron (Fe). The ancillary component includes one or two or more types of elements selected from the group consisting of lanthanum, aluminum, and iron. As will be described later, the inclusion of the ancillary component in the cerium dioxide particles 21 improves the heat resistance of the oxidation catalyst 2.

In order to more reliably improve the heat resistance of the oxidation catalyst 2, a mass ratio of the ancillary component to cerium contained in the cerium dioxide particles 21 is, for example, higher than or equal to 3 mass % in terms of oxides, preferably higher than or equal to 5 mass %, and more preferably higher than or equal to 8 mass %. From the viewpoint of maintaining predetermined performance achieved by cerium dioxide, the mass ratio of the ancillary component is, for example, lower than or equal to 45 mass %, preferably lower than or equal to 40 mass %, and more preferably lower than or equal to 35 mass %. In the case where the ancillary component contains multiple types of elements, the aforementioned mass ratio is a total mass ratio of these multiple types of elements. The mass ratio of components in the oxidation catalyst 2 can be quantified by, for example, inductively coupled plasma (ICP) spectroscopy. In one example of the production of the oxidation catalyst 2, which will be described later, the aforementioned mass ratio can be adjusted by changing a mixture ratio of cerium dioxide to a raw material for the ancillary component when generating the cerium dioxide particles 21.

In one example of the cerium dioxide particles 21, fine particles of the oxide(s) (e.g., lanthanum oxide ($La_2O_3$), aluminum oxide ($Al_2O_3$), or iron oxide ($Fe_2O_3$)) of the ancillary component are agglomerated together with fine particles of cerium dioxide. In another example of the cerium dioxide particles 21, the ancillary component is solid-dissolved in cerium dioxide crystals. Of course, both of fine particles of the oxide(s) of the ancillary component and the ancillary component solid-dissolved in cerium dioxide crystals may coexist in the cerium dioxide particles 21.

In consideration of the pore diameter of the porous material, the mean particle diameter of the cerium dioxide particles 21 is, for example, less than or equal to 30 µm, preferably less than or equal to 20 µm, and more preferably less than or equal to 10 Also, the mean particle diameter of the cerium dioxide particles 21 is, for example, greater than or equal to 0.5 µm, preferably greater than or equal to 1 µm, and more preferably greater than or equal to 2 µm. The mean particle diameter of the cerium dioxide particles 21 is obtained by, for example, calculating a mean value of the particle diameters of the cerium dioxide particles 21 in an image of the oxidation catalyst 2 captured at a predetermined magnification by a scanning electron microscope (SEM). Alternatively, the mean particle diameter may be obtained by laser diffractometry.

The metal oxide 22 contains iron (Fe) and manganese (Mn). The presence of the metal oxide 22 allows the oxidation catalyst 2 to oxidize NO contained in the exhaust gas appropriately into $NO_2$. Typically, the metal oxide 22 is dispersed on the surfaces of the cerium dioxide particles 21 and adhere to these surfaces. That is, the metal oxide 22 is fine adherent particles that adhere to the cerium dioxide particles 21. Assuming that the cerium dioxide particles 21 serve as carriers, the metal oxide 22 is a substance to be carried. In FIG. 5, an iron oxide 22a and a manganese oxide 22b that are included in the metal oxide 22 are indicated by small circles. The metal oxide 22 may cover the surfaces of the cerium dioxide particles 21. Alternatively, some fine particles of the metal oxide 22 may be held in the interior of the cerium dioxide particles 21 (e.g., between fine particles of cerium dioxide). The mean particle diameter of the metal oxide 22 is smaller than the mean particle diameter of the cerium dioxide particles 21, e.g., smaller than or equal to 0.5 µm. The mean particle diameter of the metal oxide 22 can be obtained with a scanning electron microscope in the same manner as in the case of the cerium dioxide particles 21.

One example of the metal oxide 22 consists of only an iron-containing oxide and a manganese-containing oxide. In the present embodiment, the metal oxide 22 is at least one of $FeMnO_3$, $Fe_2O_3$, and $Mn_2O_3$. Manganese (Mn) may be solid-dissolved in $Fe_2O_3$, or iron (Fe) may be solid-dissolved in $Mn_2O_3$. Both of $Fe_2O_3$ and $Mn_2O_3$ are stable in a temperature range of 200 to 800° C. Depending on the design of the oxidation catalyst 2, the metal oxide 22 may contain other metal elements. The metal oxide 22 is typically a transition-metal oxide that contains only transition metal.

In order to exhibit high catalytic performance with the metal oxide 22, the mass ratio of the metal oxide 22 to the oxidation catalyst 2, i.e., the total mass ratio of the iron-containing oxide and the manganese-containing oxide to the whole of the oxidation catalyst 2 in the present embodiment, is, for example, higher than or equal to 5 mass %, preferably higher than or equal to 10 mass %, and more preferably higher than or equal to 15 mass %. An excessively high mass ratio of the metal oxide 22 causes the entire surfaces of the cerium dioxide particles 21 to be covered with the metal oxide 22, which leads to a reduction in the performance of the cerium dioxide particles 21 adsorbing nitrogen monoxide. Therefore, from the viewpoint of ensuring a certain degree of adsorption performance of the cerium dioxide particles 21, the mass ratio of the metal oxide 22 is, for example, lower than or equal to 40 mass %, preferably lower than or equal to 35 mass %, and more preferably lower than or equal to 30 mass %.

The mass ratio of manganese in the metal oxide 22 to the total mass of iron and manganese is, for example, higher than or equal to 10 mass % in terms of oxides and preferably higher than or equal to 20 mass %. The mass ratio of manganese is, for example, lower than or equal to 90 mass % and preferably lower than or equal to 80 mass %. In one example of the production of the oxidation catalyst 2, which will be described later, the aforementioned mass ratio can be adjusted by changing a composition ratio of manganese and iron in a solution that is used when causing the cerium dioxide particles 21 to hold the metal oxide 22. Moreover, the crystal structure of the metal oxide 22 can be adjusted by changing a firing temperature. The crystal structure of the metal oxide 22 is, for example, a hematite- ($Fe_2O_3$ with solid-dissolved Mn) or bixbite-type ($Mn_2O_3$ with solid-dissolved Fe) structure.

Method of Producing Oxidation Catalyst

Figure 6:
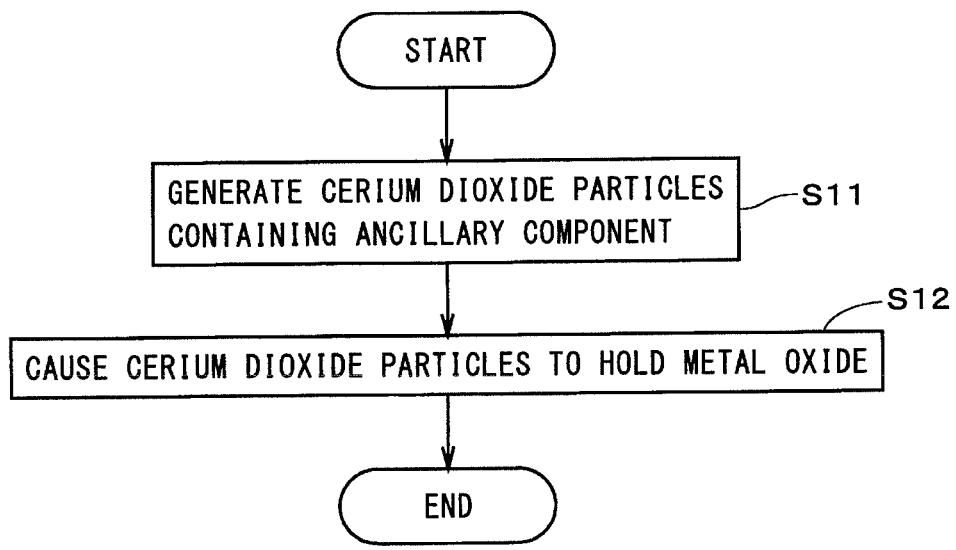
FIG. 6 illustrates a flow of processing performed when producing an oxidation catalyst.

FIG. 6 illustrates a flow of processing performed when producing the oxidation catalyst 2. First, a raw material for the ancillary component is dissolved in water to make an aqueous solution of the ancillary component. The raw material for the ancillary component is, for example, lanthanum nitrate ($La(NO_3)_3 \cdot 6H_2O$), aluminum nitrate ($Al(NO_3)_3 \cdot 9H_2O$), or iron nitrate ($Fe(NO_3)_3 \cdot 9H_2O$). Then, cerium dioxide powder is mixed into the aqueous solution. Water is evaporated from the aqueous solution to make powder of a mixture of the ancillary component and cerium dioxide. The powder is then fired at a predetermined temperature (e.g., 500 to 700° C.) in the atmosphere to generate the cerium dioxide particles 21 containing the ancillary component (step S11). In the cerium dioxide particles 21, for example, fine particles of oxides of the ancillary component are agglomerated together with fine particles of cerium dioxide, or the ancillary component is solid-dissolved in cerium dioxide crystals.

Then, the aforementioned cerium dioxide particles 21 are mixed into an aqueous solution made by dissolving a raw material for the metal oxide 22 in water. The raw material for the metal oxide 22 contains iron and manganese, and for example, the raw material is iron nitrate ($Fe(NO_3)_3 \cdot 9H_2O$) and manganese nitrate ($Mn(NO_3)_2 \cdot 6H_2O$). Water is evaporated from the aqueous solution to make powder of a mixture of iron, manganese, and the cerium dioxide particles 21. Then, the powder is fired at a predetermined temperature (e.g., 500 to 700° C.) in the atmosphere so that the metal oxide 22 containing iron and manganese is held (supported) by the cerium dioxide particles 21 (step S12). Through the above-described processing, the oxidation catalyst 2 is produced. Typically, the metal oxide 22 is dispersed on the surfaces of the cerium dioxide particles 21 and adheres to these surfaces.

Method of Producing Catalyst Support Structure

Figure 7:
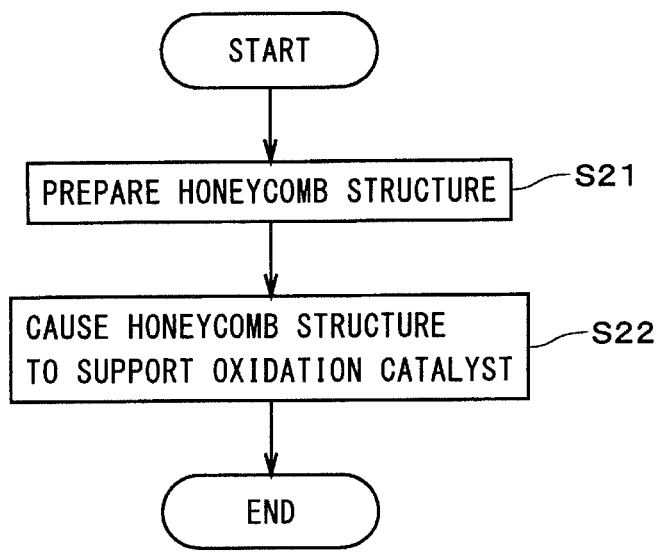
FIG. 7 illustrates a flow of processing performed when producing a catalyst support structure.

Next, the production of the catalyst support structure 1 using the oxidation catalyst 2 will be described. FIG. 7 illustrates a flow of processing performed when producing the catalyst support structure 1. First, the honeycomb structure 10 is produced as a preparation (step S21). In the production of the honeycomb structure 10, a compact is produced by, for example, extrusion molding of kneaded clay that contains a ceramic raw material, a binder, a pore forming material, and other materials. The compact is a tubular member whose interior is partitioned into a plurality of cells by partition walls. One end of each cell is filled as necessary with slurry for forming a sealer. Then, the compact is fired to produce the honeycomb structure 10. Before firing, the compact may be subjected to drying or calcination.

After the honeycomb structure 10 has been prepared, a fluid (slurry) made by dispersing the oxidation catalyst 2 is supplied to the honeycomb structure 10. In one example, the honeycomb structure 10 is immersed in slurry made by dispersing the oxidation catalyst 2 in water. The honeycomb structure 10 is then taken out of the slurry and dried. Then, the weight of the dried honeycomb structure 10 is measured. The supply of the slurry to the honeycomb structure 10 and the drying of the honeycomb structure 10 described above are repeated until the weight of the dried honeycomb structure 10 is increased by a predetermined amount from its previously measured weight before the supply of the slurry. Thereafter, the honeycomb structure 10 is fired at a predetermined temperature (e.g., 300° C.). This temperature is preferably lower than the firing temperature at the time of production of the oxidation catalyst 2 and the firing temperature of the aforementioned compact. In this way, the oxidation catalyst 2 is supported on the partition walls 12 of the honeycomb structure 10 (step S22). In the present embodiment, the oxidation catalyst 2 is supported in the pores 121 of the partition walls 12. Through the above-described processing, the catalyst support structure 1 is produced. A preferable catalyst support structure 1 does not contain a catalyst of precious metal and therefore can be produced at low cost.

Comparison with Catalyst Support Structure of Comparative Example

Here, a catalyst support structure in which cerium dioxide particles of an oxidation catalyst contain no ancillary components is assumed to be a catalyst support structure according to a comparative example and compared with the above-described catalyst support structure 1. The catalyst support structure according to the comparative example is identical to the catalyst support structure 1, except that its cerium dioxide particles contain no ancillary components.

A comparison between the catalyst support structure 1 and the catalyst support structure according to the comparative example, which support the same amount of oxidation catalyst, shows that the catalyst support structure 1 has a lower pressure loss (pressure loss due to gas at a fixed flow rate; also referred to as "initial pressure loss") than the catalyst support structure according to the comparative example, when no soot is deposited. Although why pressure loss is low is unclear, when cross-sections of these catalyst support structures are observed with a scanning electron microscope, there are some sites here and there where certain amounts of oxidation catalyst are aggregated (agglomerated) and adhere to the partition walls, throughout the catalyst support structure according to the comparative example. In contrast, the degree of dispersion of the oxidation catalyst 2 in the catalyst support structure 1 is higher than that in the catalyst support structure according to the comparative example. Therefore, it can be thought that less aggregation of the oxidation catalyst 2 (i.e., few amounts of the oxidation catalyst 2 that almost block the pores 121) in the catalyst support structure 1 contributes to a reduction in pressure loss.

A conceivable reason why the catalyst support structure 1 obtains a high degree of dispersion of the oxidation catalyst 2 is that, when the honeycomb structure is caused to support the oxidation catalyst, the dispersion condition of the oxidation catalyst 2 in water differs from that of the oxidation catalyst according to the comparative example. Specifically, while the oxidation catalyst according to the comparative example is easily agglomerated in water, the oxidation catalyst 2 is assumed to be easily dispersed in water because, due to the presence of the ancillary component contained in the cerium dioxide particles 21, its surface potential in water differs from the surface potential of the oxidation catalyst according to the comparative example.

In the case of using the catalyst support structure in the CSF 83 of the exhaust gas purification system 8 in FIG. 1, the rate of conversion from NO to $NO_2$ (i.e., $NO_2$ conversion rate) can be increased by increasing the amount of supported oxidation catalyst. On the other hand, the initial pressure loss will also increase if the amount of supported oxidation catalyst is increased. In the exhaust gas purification system 8, a maximum value for allowable initial pressure loss is set, and the oxidation catalyst 2 with low pressure loss can be supported in increased amounts by the catalyst support structure when compared to the oxidation catalyst according to the comparative example. As a result, it is possible to improve oxidation performance in the catalyst support structure 1 that is a filter supporting the oxidation catalyst 2.

In actual practice, the oxidation catalyst 2 in the catalyst support structure 1 has an increased contact area with the exhaust gas because of its high degree of dispersion. It can also be thought that activity of the metal oxide 22 increases due to the effect of the ancillary component. Thus, also from this point of view, the catalyst support structure 1 in which the cerium dioxide particles 21 contain the ancillary component is expected to have a high $NO_2$ conversion rate. Note that the catalyst support structure 1 may also oxidize carbon monoxide (CO) or soluble organic fractions (SOF) such as hydrocarbon (HC) contained in the exhaust gas.

As described previously, the temperature of the CSF 83 becomes high due to combustion of collected soot. In the case where heat treatment assuming the aforementioned high temperature conditions (e.g., heat treatment at 750° C.) is performed on both of the catalyst support structure 1 and the catalyst support structure according to the comparative example, cerium dioxide particles, each of which is an agglomerated particle of fine particles, in the catalyst support structure according to the comparative example partially undergo sintering, which leads to a considerable reduction in the specific surface area of the oxidation catalyst. As a result, the contact area of the oxidation catalyst with the exhaust gas decreases, and the catalyst support structure according to the comparative example has a lower $NO_2$ conversion rate after the heat treatment.

In contrast, the catalyst support structure 1 can suppress sintering and thereby suppress a reduction in the specific surface area of the oxidation catalyst 2 by including the ancillary component in the cerium dioxide particles 21. As a result, the catalyst support structure 1 has a low rate of deterioration in the $NO_2$ conversion rate before and after the heat treatment, and has a higher $NO_2$ conversion rate after the heat treatment than the catalyst support structure according to the comparative example that supports the same amount of oxidation catalyst. In this way, the oxidation catalyst 2 can suppress a reduction in catalytic performance caused by heat treatment, i.e., can improve heat resistance. As described previously, the amount of the oxidation catalyst 2 supported by the catalyst support structure can be increased as compared to the amount of oxidation catalyst according to the comparative example. Therefore, oxidation performance in the filter can be improved considerably, together with the aforementioned suppression of the reduction in specific surface area. Note that the specific surface area can be measured using, for example, BET method.

EXAMPLES

Next, examples will be described. Here, oxidation catalysts and catalyst support structures were produced as Examples 1 to 11 and Comparative Examples 1 to 3 under conditions given by Table 1.

TABLE 1

| | | Fe/Mn MOLAR RATIO | | La/Ce MOLAR RATIO | | Al/Ce MOLAR RATIO | | Fe/Ce MOLAR RATIO | | BASE MATERIAL | | | AMOUNT OF SUPPORTED CATALYST |
|---|---|---|---|---|---|---|---|---|---|---|---|---|---|
| | | Fe | Mn | La | Ce | Al | Ce | Fe | Ce | MATERIAL | OPEN POROSITY [%] | MEAN PORE DIAMETER [μm] | [g/L] |
| EXAMPLE | 1 | 50 | 50 | 20 | 80 | | | | | Si-BONDED SiC | 41.0 | 11.0 | 20 |
| EXAMPLE | 2 | | | | | | | | | | | | 30 |
| EXAMPLE | 3 | | | 10 | 90 | | | | | | | | 20 |
| EXAMPLE | 4 | | | 30 | 70 | | | | | | | | |
| EXAMPLE | 5 | 90 | 10 | 20 | 80 | | | | | | | | |
| EXAMPLE | 6 | 20 | 80 | | | | | | | | | | |
| EXAMPLE | 7 | 50 | 50 | | | 30 | 70 | | | | | | |
| EXAMPLE | 8 | | | | | | | 30 | 70 | | | | |
| EXAMPLE | 9 | | | 20 | 80 | | | | | CORDIERITE | 58.0 | 13.0 | 10 |
| EXAMPLE | 10 | | | | | | | | | | | | 20 |
| EXAMPLE | 11 | | | | | | | | | | | | 30 |
| COMPARATIVE EXAMPLE | 1 | 50 | 50 | 0 | 100 | 0 | 100 | 0 | 100 | Si-BONDED SiC | 41.0 | 11.0 | 10 |
| COMPARATIVE EXAMPLE | 2 | | | | | | | | | | | | 20 |

TABLE 1-continued

|  | | Fe/Mn MOLAR RATIO | | La/Ce MOLAR RATIO | | Al/Ce MOLAR RATIO | | Fe/Ce MOLAR RATIO | | BASE MATERIAL | OPEN POROSITY [%] | MEAN PORE DIAMETER [μm] | AMOUNT OF SUPPORTED CATALYST [g/L] |
|---|---|---|---|---|---|---|---|---|---|---|---|---|---|
|  | | Fe | Mn | La | Ce | Al | Ce | Fe | Ce | MATERIAL | | | |
| COMPARATIVE EXAMPLE | 3 | | | | | | | | | | | | 30 |

Examples 1 to 11

In the production of the oxidation catalysts, first, water and nitrate (La(NO$_3$)$_3$.6H$_2$O, Al(NO$_3$)$_3$.9H$_2$O, Fe(NO$_3$)$_3$.9H$_2$O) powder of an ancillary component were weighed, and the nitrate was dissolved in the water in a container to make an aqueous solution containing the ancillary component. In Examples 1 to 6 and 9 to 11, lanthanum (La) was used as the ancillary component. In Example 7, aluminum (Al) was used as the ancillary component. In Example 8, iron (Fe) was used as the ancillary component.

Next, cerium dioxide (CeO$_2$) powder was weighed and mixed into the aforementioned aqueous solution. The mixture ratio (molar ratio) of the ancillary component to cerium (Ce) was given in the "La/Ce Molar Ratio," "Al/Ce Molar Ratio," and "Fe/Ce Molar Ratio" columns in Table 1. The aqueous solution was stirred using a hot stirrer at 90° C. for approximately five hours. After the nonexistence of water in the container was confirmed by visual inspection, a mixture in the container was dried enough at 90° C. for approximately five hours with a dryer to make powder containing the ancillary component and cerium dioxide. The powder was fired at a temperature of 500 to 700° C. in the atmosphere and then pulverized in a mortar. The pulverized powder was sized by passing through a 200-mesh sieve to make cerium dioxide particles containing the ancillary component.

Then, water, iron nitrate (Fe(NO$_3$)$_3$.9H$_2$O) powder, and manganese nitrate (Mn(NO$_3$)$_2$.6H$_2$O) powder were weighed, and both the iron nitrate powder and the manganese nitrate powder were dissolved in the water in a container to make an aqueous solution containing iron (Fe) and manganese (Mn). The mixture ratio (molar ratio) of iron and manganese was given in the "Fe/Mn Molar Ratio" column in Table 1. The cerium dioxide particles containing the ancillary component were weighed and mixed into the aforementioned aqueous solution, and the aqueous solution was stirred using a hot stirrer at 90° C. for approximately five hours. After the nonexistence of water in the container was confirmed by visual inspection, a mixture in the container was dried enough at 90° C. for approximately five hours with a dryer to make powder containing iron, manganese, and cerium dioxide particles. The dried powder was fired at 700° C. in the atmosphere and then pulverized in a mortar. The pulverized powder was sized by passing through a 200-mesh sieve to make cerium dioxide particles holding iron and manganese oxides (metal oxides). In this way, the oxidation catalysts of Examples 1 to 11 were produced.

Table 2 shows the molar ratios of components in the oxidation catalysts of Examples 1 to 11 (and Comparative Examples 1 to 3). Table 2 also shows values obtained by converting the molar ratio of each component into a mass ratio, and the mass ratio of the ancillary component to cerium contained in the cerium dioxide particles in terms of oxides (i.e., value obtained by dividing the mass ratio of the oxides of the ancillary component by the mass ratio of cerium dioxide particles). In any of these cases, the mass ratio of the metal oxides to the whole of the oxidation catalyst was 20 mass %.

TABLE 2

|  | | COMPONENTS OF OXIDATION CATALYST [MASS %] | | | | | | RATIO OF ANCILLARY COMPONENT IN CeO2 PARTICLES [MASS %] | COMPONENTS OF OXIDATION CATALYST [MOL %] | | | | | |
|---|---|---|---|---|---|---|---|---|---|---|---|---|---|---|
|  | | Fe2O3 | Mn2O3 | La2O3 | Al2O3 | CeO2 | TOTAL | | Fe2O3 | Mn2O3 | La2O3 | Al2O3 | CeO2 | TOTAL |
| EXAMPLE | 1 | 10.1 | 9.9 | 13.9 | 0.0 | 66.1 | 100.0 | 21.0 | 11.4 | 11.4 | 7.7 | 0.0 | 69.5 | 100.0 |
| EXAMPLE | 2 | 10.1 | 9.9 | 13.9 | 0.0 | 66.1 | 100.0 | 21.0 | 11.4 | 11.4 | 7.7 | 0.0 | 69.5 | 100.0 |
| EXAMPLE | 3 | 10.1 | 9.9 | 7.2 | 0.0 | 72.8 | 100.0 | 10.0 | 11.0 | 11.0 | 3.9 | 0.0 | 74.0 | 100.0 |
| EXAMPLE | 4 | 10.1 | 9.9 | 20.0 | 0.0 | 60.0 | 100.0 | 33.4 | 11.8 | 11.8 | 11.5 | 0.0 | 65.0 | 100.0 |
| EXAMPLE | 5 | 18.0 | 2.0 | 13.9 | 0.0 | 66.1 | 100.0 | 21.0 | 20.4 | 2.3 | 7.7 | 0.0 | 69.6 | 100.0 |
| EXAMPLE | 6 | 4.0 | 16.0 | 13.9 | 0.0 | 66.1 | 100.0 | 21.0 | 4.6 | 18.3 | 7.7 | 0.0 | 69.4 | 100.0 |
| EXAMPLE | 7 | 10.1 | 9.9 | 0.0 | 7.6 | 72.4 | 100.0 | 10.5 | 10.1 | 10.1 | 0.0 | 12.0 | 67.8 | 100.0 |
| EXAMPLE | 8 | 21.3 | 9.9 | 0.0 | 0.0 | 68.7 | 100.0 | — | 22.4 | 10.6 | 0.0 | 0.0 | 67.0 | 100.0 |
| EXAMPLE | 9 | 10.1 | 9.9 | 13.9 | 0.0 | 66.1 | 100.0 | 21.0 | 11.4 | 11.4 | 7.7 | 0.0 | 69.5 | 100.0 |
| EXAMPLE | 10 | 10.1 | 9.9 | 13.9 | 0.0 | 66.1 | 100.0 | 21.0 | 11.4 | 11.4 | 7.7 | 0.0 | 69.5 | 100.0 |
| EXAMPLE | 11 | 10.1 | 9.9 | 13.9 | 0.0 | 66.1 | 100.0 | 21.0 | 11.4 | 11.4 | 7.7 | 0.0 | 69.5 | 100.0 |
| COMPARATIVE EXAMPLE | 1 | 10.1 | 9.9 | 0.0 | 0.0 | 80.0 | 100.0 | 0.0 | 10.7 | 10.7 | 0.0 | 0.0 | 78.7 | 100.0 |
| COMPARATIVE EXAMPLE | 2 | 10.1 | 9.9 | 0.0 | 0.0 | 80.0 | 100.0 | 0.0 | 10.7 | 10.7 | 0.0 | 0.0 | 78.7 | 100.0 |

TABLE 2-continued

| | | COMPONENTS OF OXIDATION CATALYST [MASS %] | | | | | | RATIO OF ANCILLARY COMPONENT IN CeO2 PARTICLES | COMPONENTS OF OXIDATION CATALYST [MOL %] | | | | | |
|---|---|---|---|---|---|---|---|---|---|---|---|---|---|---|
| | | Fe2O3 | Mn2O3 | La2O3 | Al2O3 | CeO2 | TOTAL | [MASS %] | Fe2O3 | Mn2O3 | La2O3 | Al2O3 | CeO2 | TOTAL |
| COMPARATIVE EXAMPLE | 3 | 10.1 | 9.9 | 0.0 | 0.0 | 80.0 | 100.0 | 0.0 | 10.7 | 10.7 | 0.0 | 0.0 | 78.7 | 100.0 |

In the production of the catalyst support structures, first, powdered silicon carbide (SiC), a raw material for binding materials, a pore-forming material, a binder, and water were mixed to prepare a molding raw material. In Examples 1 to 8, metal silicon was used as the raw material for binding materials. In Examples 9 to 11, a cordierite raw material was used as the raw material for binding materials. The cordierite raw material is a raw material for generation of cordierite crystals by firing. The molding raw material was kneaded into kneaded clay, and the kneaded clay was subjected to extrusion molding to make a honeycomb compact. The compact was then dried and fired to make a honeycomb structure.

The honeycomb structures of Examples 1 to 8 are given as "Si-Bonded SiC" and the honeycomb structures of Examples 9 to 11 are given as "Cordierite" in "Material" of the "Base Material" column in Table 1. The honeycomb structures of Examples 1 to 8 have an open porosity of 41.0% and a mean pore diameter of 11.0 The honeycomb structures of Examples 9 to 11 have an open porosity of 58.0% and a mean pore diameter of 13.0 μm. The open porosities were measured by Archimedes method, and the mean pore diameters were measured by mercury intrusion porosimetry (in accordance with JIS R1655).

Then, water and powder of the aforementioned oxidation catalysts were weighed, and the powder was mixed into the water in a container to make slurry. The honeycomb structures as a whole were immersed in the slurry and then taken out after a while. Air was blown with an air gun on the honeycomb structures to remove the slurry adhering to the outer surfaces of the honeycomb structures. Thereafter, the honeycomb structures were dried enough at 90° C. for approximately two hours with a dryer, and the weights of the honeycomb structures were measured. The immersion of the honeycomb structures in the slurry, the drying of the honeycomb structures, and the weight measurements of the honeycomb structures were repeated until the weights of the dried honeycomb structures were increased by an amount corresponding to the amount of supported oxidation catalysts given in the "Amount of Supported Catalyst" column in Table 1 from their previously measured weight before the supply of the slurry. Thereafter, the honeycomb structures were fired at 300° C. In this way, the oxidation catalysts were caused to be supported in the pores of the partition walls of the honeycomb structures, and the catalyst support structures of Examples 1 to 11 were produced.

Comparative Examples 1 to 3

The catalyst support structures of Comparative Examples 1 to 3 were produced in the same manner as those of Examples 1 to 11, except that the ancillary component (lanthanum, aluminum, and iron) was not used in the production of the oxidation catalysts. In Comparative Examples 1 to 3, metal silicon was used as the raw material for binding materials in the production of the honeycomb structures.

Identification of Crystalline Phases of Components in Oxidation Catalysts

The crystalline phases of components in the produced oxidation catalysts were identified. In the identification of the crystalline phases of components, first, X-ray diffraction patterns were obtained with an X-ray diffractometer. A rotating anti-cathode X-ray diffractometer (RINT by Rigaku Corporation) was used as the X-ray diffractometer. Conditions for x-ray diffractometry include a CuKα-ray source, 50 kV, 300 mA, and 2θ=10 to 60°. X-ray diffraction data was analyzed using X-ray data analysis software JADE7 by MDI Corporation to identify the crystalline phases of components in the oxidation catalysts. Table 3 shows the results of identification of the crystalline phases of components in the oxidation catalysts of Examples 1 to 11 and Comparative Examples 1 to 3. Table 3 shows the identification results of the crystalline phases of components before and after heat treatment, which will be described later. In Table 3, open circles in the column of each crystalline phase indicate the presence of that crystalline phase, and dashes indicate the absence of that crystalline phase. The presence of FeMnO3 after heat treatment was confirmed in Examples 1 to 4 and 7 to 11 and Comparative Examples 1 to 3.

TABLE 3

| | | CRYSTALLINE PHASES IN OXIDATION CATALYST BEFORE HEAT TREATMENT | | | | | | CRYSTALLINE PHASES IN OXIDATION CATALYST AFTER HEAT TREATMENT | | | | | |
|---|---|---|---|---|---|---|---|---|---|---|---|---|---|
| | | CeO2 | La2O3 | Al2O3 | Fe2O3 | Mn2O3 | FeMnO3 | CeO2 | La2O3 | Al2O3 | Fe2O3 | Mn2O3 | FeMnO3 |
| EXAMPLE | 1 | ○ | — | — | ○ | ○ | — | ○ | — | — | ○ | ○ | ○ |
| EXAMPLE | 2 | ○ | — | — | ○ | ○ | — | ○ | — | — | ○ | ○ | ○ |
| EXAMPLE | 3 | ○ | — | — | ○ | ○ | — | ○ | — | — | ○ | ○ | ○ |
| EXAMPLE | 4 | ○ | — | — | ○ | ○ | — | ○ | — | — | ○ | ○ | ○ |
| EXAMPLE | 5 | ○ | — | — | ○ | — | — | ○ | — | — | ○ | — | — |
| EXAMPLE | 6 | ○ | — | — | — | ○ | — | ○ | — | — | — | ○ | — |
| EXAMPLE | 7 | ○ | — | — | ○ | ○ | — | ○ | — | — | — | — | ○ |
| EXAMPLE | 8 | ○ | — | — | ○ | ○ | — | ○ | — | — | ○ | — | ○ |

TABLE 3-continued

| | | CRYSTALLINE PHASES IN OXIDATION CATALYST BEFORE HEAT TREATMENT | | | | | | CRYSTALLINE PHASES IN OXIDATION CATALYST AFTER HEAT TREATMENT | | | | | |
|---|---|---|---|---|---|---|---|---|---|---|---|---|---|
| | | $CeO_2$ | $La_2O_3$ | $Al_2O_3$ | $Fe_2O_3$ | $Mn_2O_3$ | $FeMnO_3$ | $CeO_2$ | $La_2O_3$ | $Al_2O_3$ | $Fe_2O_3$ | $Mn_2O_3$ | $FeMnO_3$ |
| EXAMPLE | 9 | ○ | — | — | ○ | ○ | — | ○ | — | — | ○ | ○ | ○ |
| EXAMPLE | 10 | ○ | — | — | ○ | ○ | — | ○ | — | — | ○ | ○ | ○ |
| EXAMPLE | 11 | ○ | — | — | ○ | ○ | — | ○ | — | — | ○ | ○ | ○ |
| COMPARATIVE EXAMPLE | 1 | ○ | — | — | ○ | ○ | — | ○ | — | — | ○ | ○ | ○ |
| COMPARATIVE EXAMPLE | 2 | ○ | — | — | ○ | ○ | — | ○ | — | — | ○ | ○ | ○ |
| COMPARATIVE EXAMPLE | 3 | ○ | — | — | ○ | ○ | — | ○ | — | — | ○ | ○ | ○ |

Heat-Resistance Test

The $NO_2$ conversion rates before and after heat treatment in each catalyst support structure were measured as a heat-resistance test. Table 4 shows the results of the heat-resistance test conducted on the catalyst support structures of Examples 1 to 11 and Comparative Examples 1 to 3. Table 4 also shows the results of measurement of pressure loss in the initial stage (initial pressure loss) with gas at a fixed flow rate in each catalyst support structure before heat treatment.

The $NO_2$ conversion rate was calculated from $((b/(a+b)))$, where a is the NO concentration and b is the $NO_2$ concentration.

Table 4 also shows the rate of deterioration in the $NO_2$ conversion rate. The rate of deterioration in the $NO_2$ conversion rate was calculated from $((c-d)/c)$, where c is the $NO_2$ conversion rate before the heat treatment and d is the $NO_2$ conversion rate after the heat treatment. Table 4 further shows an item of "Integrated Evaluation." In the integrated

TABLE 4

| | | NO2 CONVERSION RATE | | | INITIAL | |
|---|---|---|---|---|---|---|
| | | BEFORE HEAT TREATMENT % | AFTER HEAT TREATMENT % | RATE OF DETERIORATION IN NO2 CONVERSION RATE % | PRESSURE LOSS kPa | INTEGRATED EVALUATION |
| EXAMPLE | 1 | 48.1 | 21.8 | 54.5 | 1.97 | ○ |
| EXAMPLE | 2 | 62.5 | 33.2 | 46.9 | 2.05 | ○ |
| EXAMPLE | 3 | 58.3 | 26.5 | 54.5 | 1.98 | ○ |
| EXAMPLE | 4 | 59.6 | 27.1 | 54.5 | 1.95 | ○ |
| EXAMPLE | 5 | 33.0 | 15.0 | 54.5 | 1.95 | ○ |
| EXAMPLE | 6 | 46.9 | 21.3 | 54.5 | 2.00 | ○ |
| EXAMPLE | 7 | 33.1 | 15.1 | 54.5 | 1.97 | ○ |
| EXAMPLE | 8 | 33.4 | 15.2 | 54.5 | 2.05 | ○ |
| EXAMPLE | 9 | 41.0 | 27.3 | 33.3 | 1.90 | ○ |
| EXAMPLE | 10 | 64.7 | 32.3 | 50.0 | 1.97 | ○ |
| EXAMPLE | 11 | 82.0 | 48.2 | 41.2 | 2.05 | ○ |
| COMPARATIVE EXAMPLE | 1 | 33.0 | 6.9 | 79.2 | 2.05 | X |
| COMPARATIVE EXAMPLE | 2 | 49.5 | 14.0 | 71.7 | 2.12 | X |
| COMPARATIVE EXAMPLE | 3 | 66.0 | 20.0 | 69.7 | 2.20 | X |

In the heat treatment, a mixed gas containing 10% oxygen ($O_2$), 10% water vapor ($H_2O$), and 80% nitrogen ($N_2$) was heated to 750° C., and the catalyst support structures were held in the mixed gas for 16 hours. In the measurement of the $NO_2$ conversion rate, each catalyst support structure was processed into a test specimen with a diameter of 25.4 mm and a length of 50.8 mm, and the outer surface of the test specimen was coated. This was used as a measurement sample for evaluation using an automobile exhaust gas analyzer (SIGU1000 by HORIBA, Ltd.). Specifically, the aforementioned measurement sample was set in a reaction tube in a heating furnace and held at 250° C. Also, a mixed gas containing 200-ppm nitrogen monoxide (NO) and 10% oxygen, the remainder of which was nitrogen, was heated to 250° C. and introduced into the measurement sample in the reaction tube. Then, gas (exhaust gas) emitted from the measurement sample was analyzed using an exhaust gas measurement system (MEXA-6000FT by HORIBA, Ltd.) to calculate NO and $NO_2$ concentrations in the exhaust gas.

evaluation, open circles indicate catalyst support structures whose $NO_2$ conversion rate after the heat treatment is higher than or equal to 15% and whose initial pressure loss is lower than or equal to 2.15 kPa, and crosses indicate catalyst support structures whose $NO_2$ conversion rate after the heat treatment is less than 15% or whose initial pressure loss exceeds 2.15 kPa.

As shown in Table 4, the catalyst support structures of Examples 1 to 11 in which cerium dioxide particles contain the ancillary component (lanthanum, aluminum, and iron) have lower rates of deterioration in the $NO_2$ conversion rate than the catalyst support structures of Comparative Examples 1 to 3, in which cerium dioxide particles contain no ancillary components. Thus, it turns out that the inclusion of the ancillary component in the cerium dioxide particles improves the heat resistance of the oxidation catalysts. Also, when comparisons are made between Examples 1, 3, 4, 7, and 8 and Comparative Example 2 and between Example 2 and Comparative Example 3, all of which use the same type of base material, the same amount of supported catalyst, and the same mixture ratio of iron and manganese (Fe/Mn molar ratio), the catalyst support structures of the examples have a lower initial pressure loss than the catalyst support structures of the comparative examples. Moreover, the $NO_2$ conversion rate after the heat treatment increases because of a reduction in the rate of deterioration in the $NO_2$ conversion rate.

Variations

The oxidation catalyst 2, the catalyst support structure 1, the method of producing an oxidation catalyst, and the method of producing a catalyst support structure described above can be modified in various ways.

The cell structure that supports the oxidation catalyst 2 may be of various shapes as long as its interior is partitioned into a plurality of cells by partition walls. In the oxidation catalyst 2, the cerium dioxide particles 21 may hold other materials in addition to the metal oxide 22.

The method of producing an oxidation catalyst and the method of producing a catalyst support structure are not limited to the examples described above, and may be modified in various ways. The oxidation catalyst 2 may be used in various applications other than filters.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention. This application claims priority benefit under 35 U.S.C. Section 119 of Japanese Patent Application No. 2018-055160 filed in the Japan Patent Office on Mar. 22, 2018, the entire disclosure of which is incorporated herein by reference.

REFERENCE SIGNS LIST

1 Catalyst support structure
2 Oxidation catalyst
10 Honeycomb structure
12 Partition wall
13 Cell
21 Cerium dioxide particle
22 Metal oxide
S11, S12, S21, S22 Step

The invention claimed is:

1. An oxidation catalyst comprising:
cerium dioxide particles containing an ancillary component that is at least one of lanthanum, aluminum, and iron; and
a metal oxide containing iron and manganese and held by said cerium dioxide particles;
wherein the ancillary component is agglomerated with the cerium dioxide particles or solid-dissolved in the crystals of the cerium dioxide particles.

2. The oxidation catalyst according to claim 1, wherein a mass ratio of said ancillary component to cerium contained in said cerium dioxide particles is in a range of 3 to 45 mass % in terms of oxides.

3. The oxidation catalyst according to claim 2, wherein a mass ratio of said metal oxide to a whole of said oxidation catalyst is in a range of 5 to 40 mass %.

4. A catalyst support structure comprising:
a cell structure whose interior is partitioned into a plurality of cells by partition walls; and
the oxidation catalyst according to claim 3, supported by said partition walls.

5. The catalyst support structure according to claim 4, wherein a precious metal is not contained.

6. A catalyst support structure comprising:
a cell structure whose interior is partitioned into a plurality of cells by partition walls; and
the oxidation catalyst according to claim 2, supported by said partition walls.

7. The catalyst support structure according to claim 6, wherein a precious metal is not contained.

8. The oxidation catalyst according to claim 1, wherein a mass ratio of said metal oxide to a whole of said oxidation catalyst is in a range of 5 to 40 mass %.

9. A catalyst support structure comprising:
a cell structure whose interior is partitioned into a plurality of cells by partition walls; and
the oxidation catalyst according to claim 8, supported by said partition walls.

10. The catalyst support structure according to claim 9, wherein a precious metal is not contained.

11. A catalyst support structure comprising:
a cell structure whose interior is partitioned into a plurality of cells by partition walls; and
the oxidation catalyst according to claim 1, supported by said partition walls.

12. The catalyst support structure according to claim 11, wherein a precious metal is not contained.

13. A method of producing an oxidation catalyst, comprising:
generating cerium dioxide particles containing an ancillary component that is at least one of lanthanum, aluminum, and iron; and
causing said cerium dioxide particles to hold a metal oxide containing iron and manganese;
wherein the ancillary component is agglomerated with the cerium dioxide particles or solid-dissolved in the crystals of the cerium dioxide particles.

14. A method of producing a catalyst support structure, comprising:
a preparation operation of preparing a cell structure whose interior is partitioned into a plurality of cells by partition walls; and
a support operation of causing the oxidation catalyst produced by the method of producing an oxidation catalyst according to claim 13 to be supported by said partition walls.

15. The method of producing a catalyst support structure according to claim 14, wherein
in said support operation, a fluid in which said oxidation catalyst is dispersed is supplied to said cell structure.

* * * * *